United States Patent [19] [11] 4,326,477
Carter [45] Apr. 27, 1982

[54] GAS-CUSHION VEHICLES
[75] Inventor: Rory A. C. Carter, Cowes, England
[73] Assignee: Vosper Hovermarine Limited, England
[21] Appl. No.: 158,100
[22] Filed: Jun. 10, 1980
[30] Foreign Application Priority Data
Jun. 18, 1979 [GB] United Kingdom ............ 20486/79
[51] Int. Cl.³ .............................................. B60V 1/16
[52] U.S. Cl. ................................... 114/67 A; 180/128
[58] Field of Search ........................... 114/67 A, 67 R; 180/128, 129, 130, 127

[56] References Cited
U.S. PATENT DOCUMENTS
3,907,061  9/1975  Chapman et al. ............... 114/67 A
4,029,036  6/1977  Magnuson ....................... 114/67 A
FOREIGN PATENT DOCUMENTS
275333  4/1965  Australia ........................ 114/67 A
795661  10/1968  Canada ........................... 114/67 A
448390  9/1976  United Kingdom ............. 180/128

Primary Examiner—Trygve M. Blix
Assistant Examiner—Stephen P. Avila
Attorney, Agent, or Firm—Steele, Gould & Fried

[57] ABSTRACT

A sidewall gas-cushion vehicle is provided with a flexible skirt of hollow inflatable form, which, in operation of the vehicle, depends from the vehicle body so that the bottom of the skirt defines a convex face in close proximity to the surface over which the vehicle travels so as to form a plenum gap through which an atmosphere-seeking flow of cushion gas escapes. The flexible skirt is of two-stage form, comprising an upper compartment and a lower compartment. A fan, an aperture in a compartment-dividing membrane and an outlet duct are provided for inflating the lower compartment to a higher pressure than that existing in the upper compartment.

14 Claims, 2 Drawing Figures

GAS-CUSHION VEHICLES

BACKGROUND TO THE INVENTION

This invention relates to gas-cushion vehicles, that is to say, to vehicles for travelling over a surface and which, in operation, are supported above that surface, at least in part, by a cushion of pressurised gas, for example, air, formed and contained between the vehicle body and the surface.

The vehicle-supporting cushion may be contained, at least in part, by a flexible skirt of hollow inflatable form depending from the vehicle body so that the bottom of the skirt defines a convex face in close proximity to the surface over which the vehicle is to travel so as to form a "plenum" gap through which an atmosphere-seeking flow of cushion gas escapes.

SUMMARY OF THE INVENTION

According to the invention, a gas-cushion vehicle is provided with a flexible skirt of hollow inflatable form, which, in operation of the vehicle, depends from the vehicle body so that the bottom of the skirt defines a convex face in close proximity to the surface over which the vehicle is to travel so as to form a plenum gap through which an atmosphere-seeking flow of cushion gas escapes, the flexible skirt being of two-stage form, comprising an upper compartment and a lower compartment, and means for inflating the lower compartment to a higher pressure than that existing in the upper compartment.

Means are preferably provided whereby a flow of inflation fluid enters the upper compartment by way of the lower compartment, and can then pass to the space occupied by the vehicle-supporting cushion.

The invention is particularly suitable in connection with "sidewall" gas-cushion vehicles. That is to say, gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal. The flexible skirt incorporated in the invention can be used to contain cushion gas at at least one end of the cushion.

BRIEF DESCRIPTION OF THE DRAWINGS

An embodiment of the invention will now be described by way of example only, with reference to the accompanying drawings, wherein.

DETAILED DESCRIPTION OF THE PREFERRED EMBODIMENT

Figure 1:
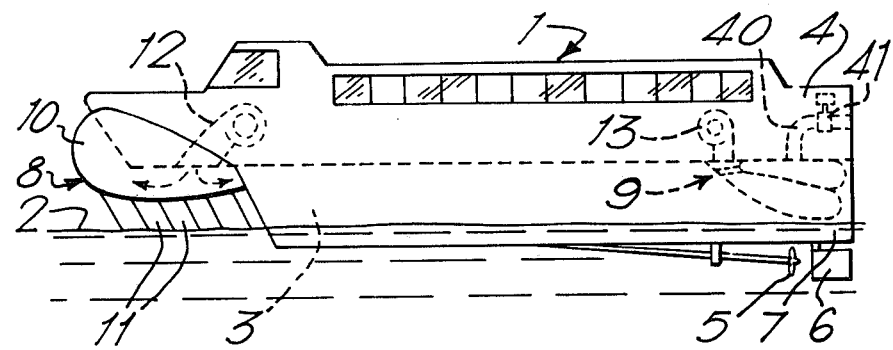
FIG. 1 is a side view of a sidewall gas-cushion vehicle.
Figure 2:
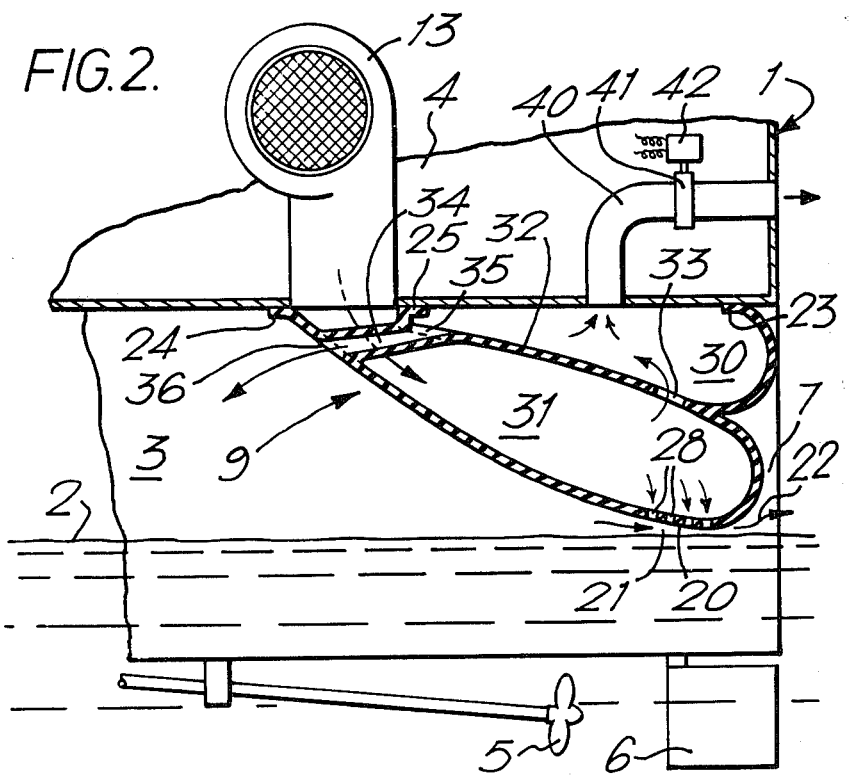
FIG. 2 is an enlarged view, in medial section, of the rear flexible skirt shown in FIG. 1.

Referring to both FIGS. 1 and 2, a sidewall gas-cushion vehicle 1 is shown travelling over the surface 2 of water, supported by a cushion 3 of pressurised air formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9 are attached to the vehicle body 4 and depend therefrom. The flexible skirt 8 is in light contact with the water surface 2. The inflation and tension forces set up in the flexible skirt 9 ensure that it is maintained clear of but in close proximity to the surface 2.

The front flexible skirt 8 is of two-stage form and comprises an inflated bag 10 from which depend a succession of independently-deflectable flexible wall or skirt members 11 of the form disclosed by British Patent Specification No. 1,043,351. Air forming the vehicle-supporting cushion 3 is provided by a pair of centrifugal fans 12 disposed side by side. Air from the fans 12 passes through the flexible skirt 8 to inflate it before entering the space occupied by the cushion 3. The rear flexible skirt 9 is inflated (to slightly above cushion pressure) by air supplied by a centrifugal fan 13. The fans 12 and fan 13 form separate means for supplying air to the space occupied by the vehicle-supporting cushion 3 and the skirt 9 respectively.

As best shown in FIG. 2, the bottom of the rear flexible skirt 9 defines a convex face 20 in close proximity to the surface 2 so as to form a plenum gap 21 through which an atmosphere-seeking flow of cushion air escapes, as indicated by arrow 22. The bottom of the flexible skirt 9 is impermeable except for a multiplicity of bleed holes 28 formed in the convex face 20 whereby skirt inflation air bleeds through the holes in the face 20 so as to suppress any tendency for local pressure changes to take place in the atmosphere-seeking flow 22 as a result of the Bernoulli effect.

The bleed holes 28, which are of about 0.25 inches diameter, form up to about 10% of that area of the convex face 20 they perforate.

The bleed holes 28 are regularly distributed in rows, one hole for each square inch of material.

In further detail, the flexible skirt 9 is of two-stage form, comprising an upper compartment 30 and a lower compartment 31. The upper and lower compartments 30, 31 are separated from each other by a flexible membrane 32.

Means, comprising the fan 13, an aperture 33 perforating the membrane 32, and an outlet passageway 34 connecting the upper compartment 30 with the cushion 3, are provided whereby, (as explained hereinafter), the lower compartment 31 is inflated to a higher pressure than that existing in the upper compartment 30.

The flexible skirt 9 has a shape which, in the vertical cross-section shown, (relative to the vehicle-supporting cushion 3), extends at first outwardly and then downwardly from a first point of attachment 23 on the vehicle body 4 to join the flexible membrane 32, and then outwardly, downwardly and and inwardly again in a smooth curve, extending up to a second point of attachment 24 on the vehicle body. The compartment-dividing membrane 32 extends upwardly and inwardly to a point of attachment 25 on the vehicle body 4. The points 23, 24 and 25 of attachment render the skirt 9 demountable from the vehicle body 4.

The outlet passageway 34 comprises a flexible duct extending between apertures 35, 36 which perforate, respectively, the upper end of the membrane 32 and the inner wall of the flexible skirt 9.

In operation, air discharged by the fan 13 flows over the pasageway 34 as it enters the lower compartment 31 of the skirt 9. This air inflates the compartment 31 to about 1.3 times cushion pressure.

Most of the air entering lower compartment 31 passes, by way of aperture 33, into upper compartment 30, where it flows by way of passageway 34, to the space occupied by the cushion 3. This escape of air from the upper compartment 30 maintains it at an inflation pressure slightly above that in the cushion 3.

The remainder of the air entering lower compartment 31 escapes therefrom by way of bleed holes 28. If it were not for the bleed holes 28, the atmosphere-seeking flow 22 of cushion air would pass smoothly through the plenum gap 21, where, due to the Bernoulli effect, local pressure changes (chiefly adjacent the outer boundary of the gap 21) would cause vibration of the flexible skirt 9. However, the bleed holes 28 allow skirt inflation air to enter the gap and interfere with the smooth laminar flow therethrough which would otherwise take place. It is also possible that the bleed holes 28 allow some backflow of air to occur which assists in the suppression of the Bernoulli effect.

Making the lower stage (31) of the flexible skirt 9 stiffer than the upper (30) stage thereof, results in an efficient two-stage skirt system.

The relatively stiff bottom stage of the skirt 9 reduces skirt distortion due to contact with the water surface 2, whilst the relatively soft upper stage ensures that the skirt retains a substantial measure of overall flexibility.

As best shown in FIG. 2, inflation pressure of the upper compartment 30 can be controlled by means comprising a vent duct 40 connecting the interior of the compartment 30 with atmosphere. A control valve 41, (under the control of the pilot of the vehicle by way of electrically-operated valve actuator 42), is used to vary the outward flow of inflation air from the duct 40, and thus adjusts the inflation pressure of the compartment 30.

Flexible skirts according to the invention can be used to replace the skirt 8 at the front or bow end of the cushion 3. Alternatively, both ends of the cushion 3 could be contained by flexible skirts according to the invention. However, use of the invention at the bow end of a gas-cushion vehicle may introduce problems on a high-speed vehicle. It would be more suitable for a low-speed vehicle.

Flexible skirts according to the invention need not be confined to sidewall gas-cushion vehicles. They may also be used, for example, in "plenum chamber" vehicles where they are of annular form so that each can contain the whole periphery of a cushion.

The convex face 20 could comprise a strip of material demountably attached to the remainder of the skirt 9. It could comprise uncoated fabric so that it is naturally permeable. Nylon netting may thus be suitable. Another alternative is woven cloth, treated, (for example by dipping), with a synthetic plastics material such as polyurethane, so as to prevent the threads of the cloth from slipping over each other.

The bleed holes 28 could be replaced by a plurality of outlet ports covered by flexible flaps.

I claim:

1. A gas-cushion vehicle provided with a flexible skirt of hollow inflatable form, which, in operation of the vehicle, depends from the vehicle body so that the bottom of the skirt defines a convex face in close proximity to the surface over which the vehicle is to travel so as to form a plenum gap through which an atmosphere-seeking flow of cushion gas escapes, the vehicle comprising:
   a flexible two-stage skirt, having an upper compartment and a lower compartment;
   means for inflating the upper and lower compartments, the lower compartment being inflated to a higher operating pressure than that existing in the upper compartment and the upper compartment being inflated to a higher operating pressure than that existing in the gas cushion, whereby the lower compartment remains relatively stiff, reducing distortion of the skirt due to contact with the travel surface and the upper compartment remains relatively soft ensuring a substantial measure of overall skirt flexibility.

2. A gas-cushion vehicle as claimed in claim 1, further comprising means whereby a flow of inflation fluid enters the upper compartment by way of the lower compartment.

3. A gas-cushion vehicle as claimed in claim 2, further comprising means whereby the inflation fluid entering the upper compartment by way of the lower compartment can also pass to the space occupied by the vehicle-supporting cushion.

4. A gas-cushion vehicle as claimed in claim 1, wherein the upper and lower compartments are separated from each other by a flexible membrane and the flexible skirt has a shape which, when viewed in vertical cross-section, extends (relative to the vehicle-supporting cushion), at first outwardly and then downwardly from a first point of attachment on the vehicle body to join the flexible membrane, and then outwardly, downwardly and inwardly again in a smooth curve, extending up to a second point of attachment on the vehicle body.

5. A gas-cushion vehicle as claimed in claim 4, wherein the flexible membrane extends upwardly and inwardly to a point of 6. A gas-cushion vehicle as claimed in claim 1, further comprising means whereby inflation fluid can enter the upper compartment by way of the lower compartment, and flexible duct means whereby inflation fluid can pass from the upper compartment to the space occupied by the vehicle-supporting cushion.

7. A gas-cushion vehicle as claimed in claim 1, wherein the bottom of the flexible skirt is impermeable except for a multiplicity of bleed holes formed in the convex face whereby skirt inflation air bleeds through the holes so as to suppress any tendency for local pressure changes to take place in the atmosphere-seeking flow as a result of the Bernoulli effect.

8. A gas-cushion vehicle as claimed in claim 7, wherein the bleed holes form up to about 10% of that area of the convex face they perforate.

9. A gas-cushion vehicle as claimed in claim 1, further comprising means for maintaining the intermediate inflation pressure of the upper compartment.

10. A gas-cushion vehicle as claimed in claim 1, for travelling over water, wherein, in operation, the sides of the vehicle-supporting cushion are contained by a pair of laterally-spaced sidewall structures extending longitudinally along the sides of the vehicle body in substantially parallel array and depending therefrom so as to dip into the water and form a cushion-gas seal.

11. A gas-cushion vehicle as claimed in claim 9, wherein the inflation maintaining means for the upper compartment comprises atmospheric venting means.

12. A gas-cushion vehicle as claimed in claim 11, wherein the atmospheric venting means comprises a vent duct connecting the interior of the upper compartment with the atmosphere and valve means for varying the outward flow of inflation fluid from the vent duct.

13. A gas-cushion vehicle provided with a flexible skirt of hollow inflatable form, which, in operation of the vehicle, depends from the vehicle body so that the bottom of the skirt defines a convex face in close proximity to the surface over which the vehicle is to travel so as to form a plenum gap through which an atmosphere-seeking flow of cushion gas escapes, the vehicle comprising:
 a two-stage skirt having an upper compartment and a lower compartment, a wall between the compartments providing a gas flow passage therebetween;
 first duct means from the upper compartment communicating with the gas cushion;
 atmospheric venting means for the upper compartment; and,
 means for supplying pressurized gas to the lower compartment, the pressurized gas then flowing into the upper compartment through the gas flow passage, and from the upper compartment flowing through the first duct means into the gas cushion, pressurized gas in the upper compartment being further subject to venting through the atmospheric venting means, the pressure in the lower compartment being maintained at a level greater than the pressure in the upper compartment, and the pressure in the upper compartment being maintained at a level greater than the pressure of the gas cushion, whereby the lower compartment remains relatively stiff, reducing distortion of the skirt due to contact with the travel surface, and the upper compartment remains relatively soft, ensuring a substantial measure of overall skirt flexibility.

14. A gas-cushion vehicle according to claim 13, wherein the atmospheric venting means comprises;
 second duct means from the upper compartment communicating with the atmosphere; and,
 valve means disposed in the second duct means.

* * * * *